L. BURGRAFF, Jr.
MEANS FOR TIRE INFLATION.
APPLICATION FILED SEPT. 7, 1911.
1,054,504.
Patented Feb. 25, 1913.
3 SHEETS—SHEET 1.
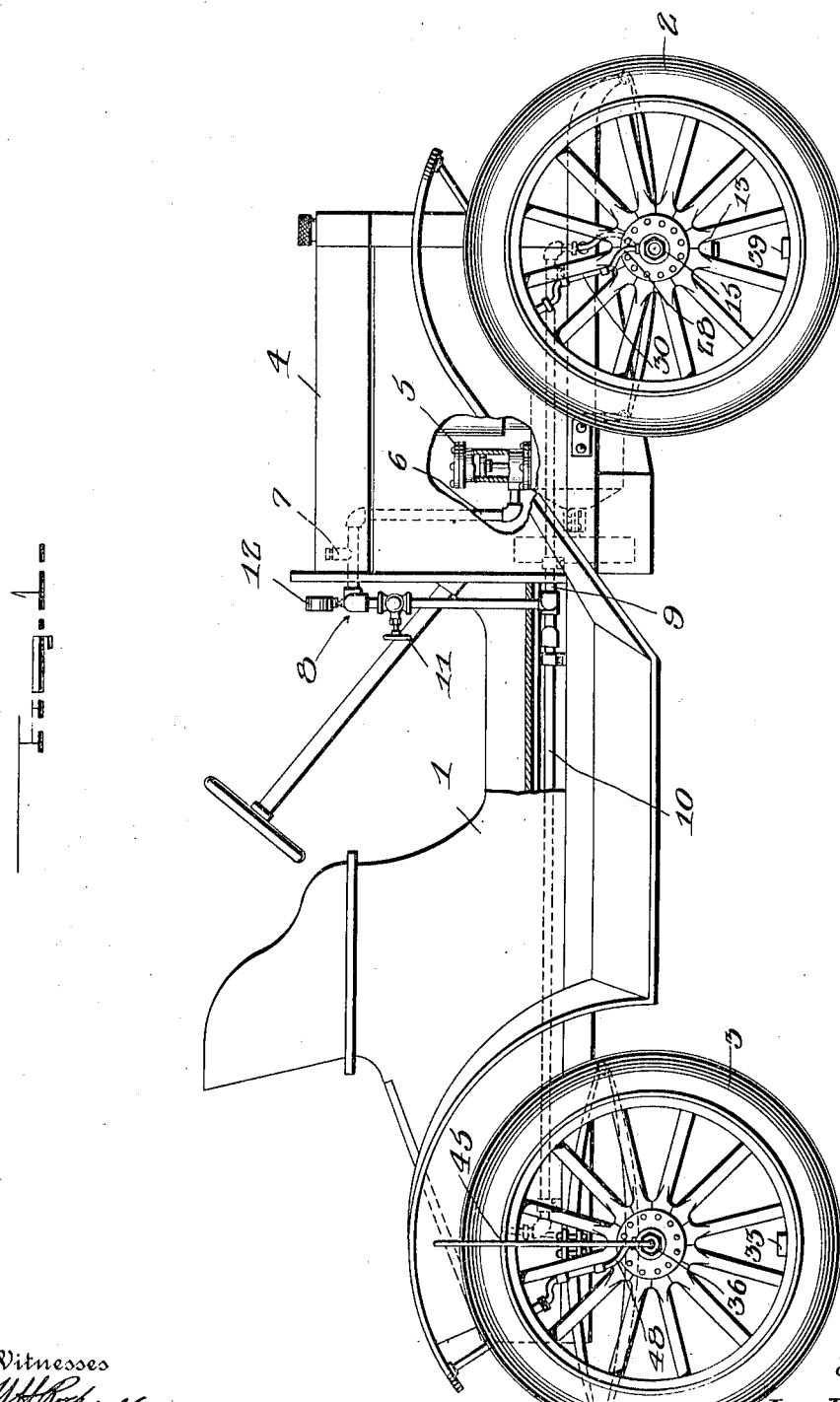
Witnesses
Inventor
L. Burgraff, Jr.
By
Attorneys

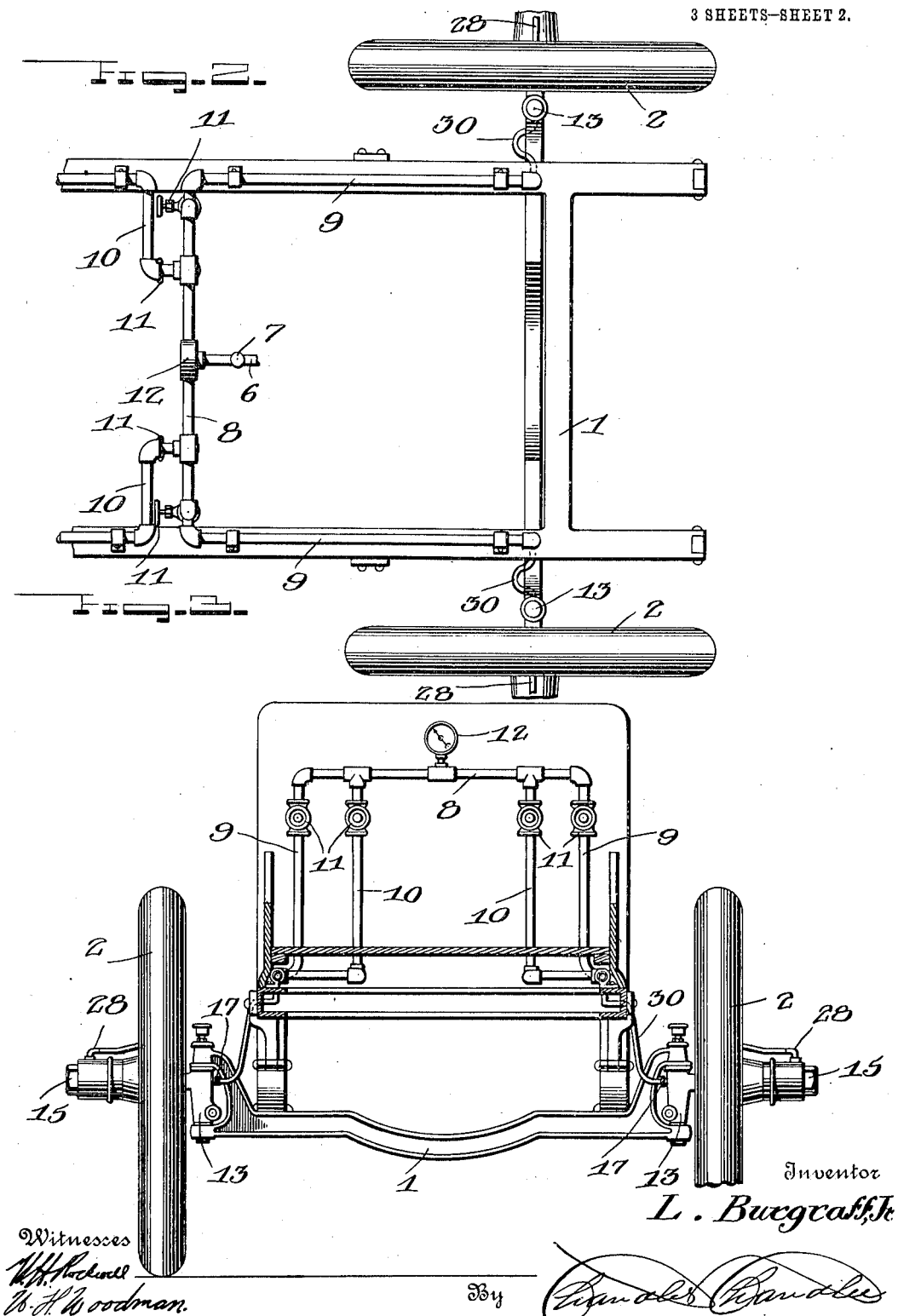

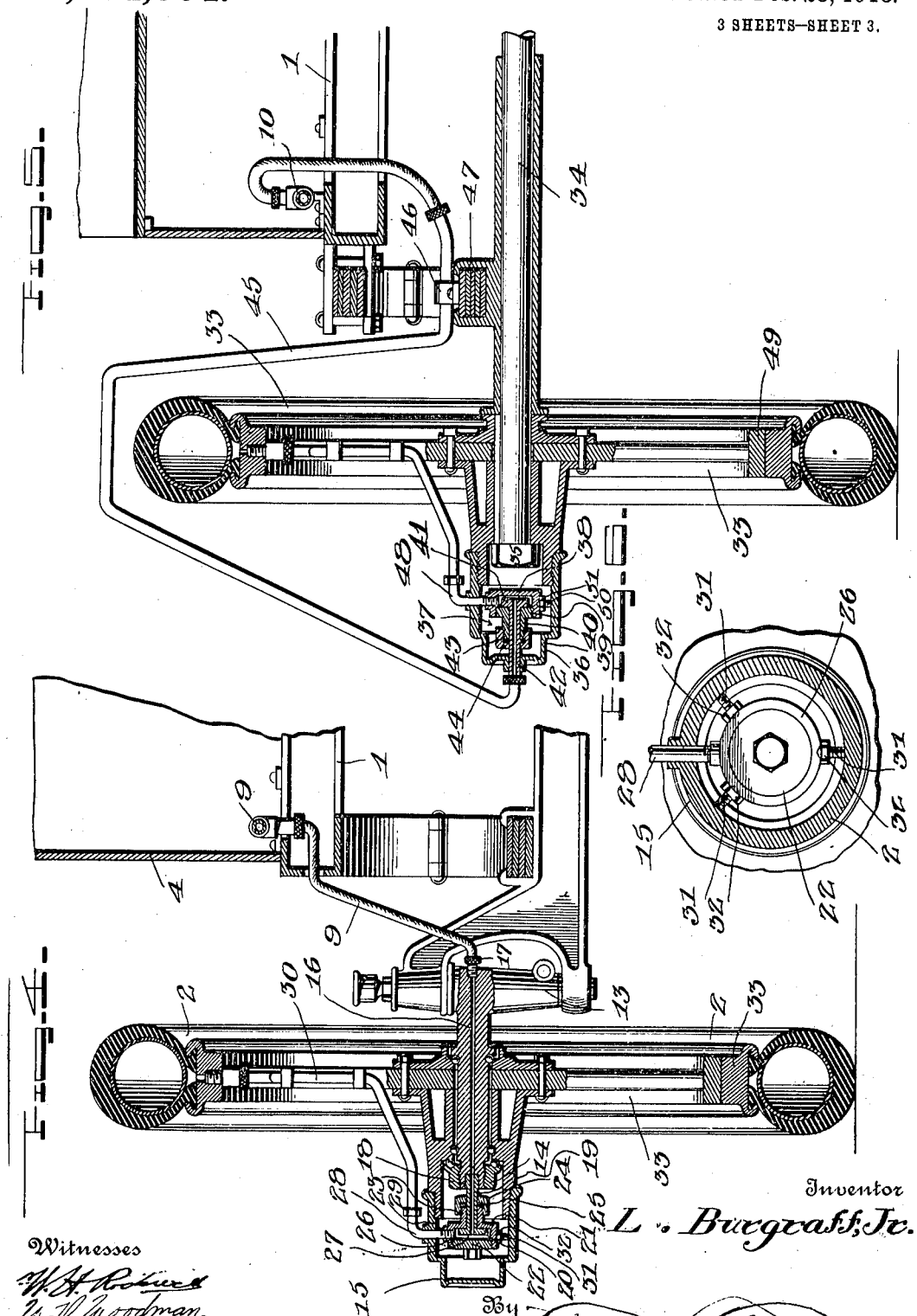

UNITED STATES PATENT OFFICE.

LOUIS BURGRAFF, JR., OF MASON CITY, IOWA.

MEANS FOR TIRE INFLATION.

1,054,504.     Specification of Letters Patent.     Patented Feb. 25, 1913.

Application filed September 7, 1911. Serial No. 648,090.

*To all whom it may concern:*

Be it known that I, LOUIS BURGRAFF, Jr., a citizen of the United States, residing at Mason City, in the county of Cerro Gordo, State of Iowa, have invented certain new and useful Improvements in Means for Tire Inflation; and I do hereby declare the following to be a full, clear, and exact description of the invention, such as will enable others skilled in the art to which it appertains to make and use the same.

My invention relates to new and useful improvements in the air distribution to pneumatic tires upon self-propelled vehicles and the like which are provided with pumps for furnishing air to the tire either while the car is at rest or while traveling and the object of my invention is to improve the construction and increase the efficiency of systems of the above described character.

A further object of my invention is the provision of a peculiar and novel system of pipe connection by means of which air may be delivered to the tire irrespective of the rotation of the wheels.

With these and other objects in view my invention will be more fully described, illustrated in the drawings which show a preferred embodiment of the system and then specifically pointed out in the claim which is attached to and forms a part of this application.

Figure 1 is a side elevation partially in section of a motor vehicle showing my improved system applied thereto. Fig. 2 is a partial top plan of the frame of a vehicle showing the arrangement of conduit pipes. Fig. 3 is a front elevation partially in section also showing the arrangement of the pipes. Fig. 4 is a sectional view of one of the forward wheels showing my invention applied thereto. Fig. 5 is a similar view of one of the rear wheels. Fig. 6 is a section on the line 6—6 of Fig. 4.

Referring more specifically to the drawings in which similar reference numerals designate corresponding parts throughout, 1 designates in general a motor propelled vehicle of any preferred type having forward steering wheels 2, the rear propelling wheels 3 and the hood 4 in which is positioned a conventional form of air pump 5 which may be arranged to be driven by the engine shaft or by foot if preferred. This pump forces air through the pipe 6 and thus furnishes the air necessary for the inflation of the tires but as the specific construction of the pump is no part of my invention I have merely illustrated a conventional form.

The pipe 6 is provided intermediate of its length with an automatic safety valve 7 of any desired type and which may be set for any desired pressure, the function of this valve being to permit the escape of air when the pressure in the tire has reached a predetermined point and to thus prevent undue inflation of the same. This pipe 6 communicates with a horizontally extending pipe 8 from which branch two pipes 9 which lead to the front wheels of the vehicle and two pipes 10 which lead to the rear wheels and each of these pipes is provided with a hand operated cut-off valve 11 by which means any one or all of the tires may be inflated at the same time. The pipe 8 is also preferably provided with a pressure gage 12 by means of which the operator can readily determine the pressure of air in the tires.

As best shown in Fig. 4 of the drawings the front or steering wheels are rotatably mounted in the customary manner upon the spindles 13 carried by the steering yokes and are secured in place in the customary manner by means of nuts 14 inclosed by the customary screw caps 15 which in this case are preferably constructed to extend somewhat further than usual from the hub for a reason which will be hereinafter apparent. Each of these spindles 13 is provided with a centrally located longitudinally extending bore 16, the knuckle end of this bore being screw threaded to receive the threaded nipple 17 to which is attached the free end of one of the pipes 9. The other end of this bore is also screw threaded to receive the threaded ends 18 of a pipe member 19 the other end of which terminates in an enlarged circular bearing head 20. Surrounding this head are the members 21 and 22 which unite to form a bonnet and as shown, the member 21 consists of a neck portion 23 through which the pipe 19 passes and which is externally threaded to receive the cap 24 which with the packing ring 25 forms a packing box to prevent the escape of the air. The outer end of this neck is enlarged to form a head 26 having a socket 27 in which is seated the bearing head 20 and this socket is closed by means of the member 22 which as shown, consists of a threaded plug which may be readily removed for repairs and the like. This socket 27 is so proportioned as to leave a space between the end of the bearing head 20 and the inner face of the plug 22 and communicating with this space is a pipe 28 one end of which is threaded into the tapped bore 29 of the head 26 and the other end of which passes out through a suitable aperture formed in the cap 15 and is connected to a pipe 30 which extends along the outer face of the hub and out one of the spokes and communicates with the tire. The bonnet formed by the members 21 and 22 is maintained in a properly centralized position with respect to the hub by means of a plurality of set screws 31 provided with lock nuts 32.

As will be readily understood the bonnet is free to revolve about the pipe 19 while at the same time it forms an air tight chamber about the same. By this means it is possible to supply air to the tires of the front wheels while said wheels are in motion. It will of course be understood that the pipe 9 or at least that portion of the pipe connecting with the nipple 17 will be formed of flexible material such as rubber tubing in order to permit of the turning of the wheel necessary in steering the vehicle. That portion of the forward wheels opposite the pipe 30 is preferably provided with a counter-weight 33 which is secured to the rim and which is adapted to counter-balance the weight of the pipe 30.

Upon vehicles in which the rear axle is dead that is stationary, the air will be supplied in the same manner as that above described by means of a bore extending through the end portions of the axle. As however, the greater proportion of vehicles are of the live axle type I have shown my system as applied to that type and as shown, the rear wheels 3 are secured upon the rear axle 34 in the customary manner and held against outward movement thereon by means of nuts 35 covered by screw caps 36. Positioned within each of these caps is a bonnet member 37 consisting of a cap or plug 38 which coacts with the head end 39 of a neck member 40 to form a socket in which is rotatably mounted the enlarged head 41 of the pipe member 42 the other end of which extends through the neck member, through a packing ring 43, a cap 44 and through the hub cap 36. The members, 39, 40 and 44 form the bonnet 37. A pipe 45 connects the free end of the pipe member 42 with one end of the pipes 10, said pipe 45 being passed over the wheel and supported in place by clamps 46 carried by the lower spring 47. Threaded into the socket formed by the members 38 and 39 is a pipe 48 the other end of which communicates with the tire of the wheel 3, said wheel being counter-balanced by a weight 49. This bonnet 37 is supported in adjusted position in the hub by set screws 50 and lock nuts 51 in the same manner as on the bonnets of the steering wheels.

In operation the pump is set in motion as the valves 11 are open to permit the passage of the air which is transmitted through the pipes 9 and 10 to the bonnets contained in the hub caps and from there to the tires and it will be readily understood that one or more tires may be inflated at the same time as any one or more of the valves may be kept closed. By means of the pressure gage it is possible for the operator to accurately gage the pressure of the air in the tires while at the same time the safety valve absolutely prevents the bursting of the tires due to carelessness or neglect on his part.

What I claim is:—

In a means for tire inflation, in combination with a non-rotatable and a rotatable element, a cap detachably mounted on the rotatable element, a nipple extending from the nonrotatable element, a flange on the end of the nipple, a fluid tight bonnet disposed in the cap, the flanged edge of the nipple disposed in the bonnet, an inflatable tire carried by the rotatable element, communicating means between the tire and the bonnet, means for positioning the bonnet centrally of the cap and a fluid supply means communicating with said nipple.

In testimony whereof, I affix my signature, in presence of two witnesses.

LOUIS BURGRAFF, JR.

Witnesses:
JOHN G. BURGRAFF,
VINCENT A. FARRELL.